United States Patent
Watanabe

(10) Patent No.: US 8,246,123 B2
(45) Date of Patent: Aug. 21, 2012

(54) BRAKE CONTROL SYSTEM OF MOTORCYCLE

(75) Inventor: Asahi Watanabe, Fujisawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 71 days.

(21) Appl. No.: 12/886,625

(22) Filed: Sep. 21, 2010

(65) Prior Publication Data

US 2011/0095599 A1 Apr. 28, 2011

(30) Foreign Application Priority Data

Oct. 26, 2009 (JP) ................................. 2009-245162

(51) Int. Cl.
*B60T 8/32* (2006.01)
(52) U.S. Cl. ..................... 303/137; 303/9.64; 303/113.5
(58) Field of Classification Search ........ 303/9.64–9.71, 303/137, 150, 163; 701/71, 72, 81, 87
See application file for complete search history.

(56) References Cited

U.S. PATENT DOCUMENTS

| | | | | |
|---|---|---|---|---|
| 6,089,682 A | * | 7/2000 | Ishikawa et al. | 303/163 |
| 2011/0098903 A1 | * | 4/2011 | Ogawa et al. | 701/71 |
| 2012/0022761 A1 | * | 1/2012 | Matsuda | 701/87 |

FOREIGN PATENT DOCUMENTS

JP 2000-127940 5/2000

* cited by examiner

*Primary Examiner* — Christopher Schwartz
(74) *Attorney, Agent, or Firm* — Antonelli, Terry, Stout & Kraus, LLP.

(57) ABSTRACT

A brake control system of a motorcycle is provided which can suppress a malfunction of an anti-lock braking system applied to a rear wheel which would be caused by an abnormal speed difference between the front and rear wheels. A threshold value for a skid rate for the rear wheel is kept to a second skid rate threshold value until a time when a predetermined condition is established. The second skid rate threshold value is larger than a first skid rate threshold value that is usually employed.

20 Claims, 4 Drawing Sheets

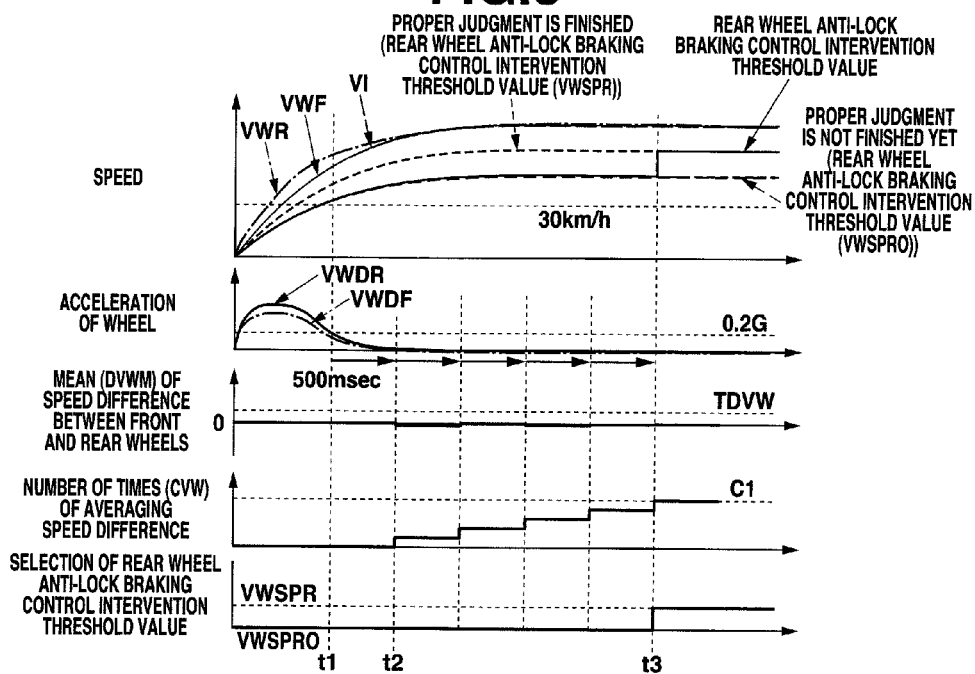
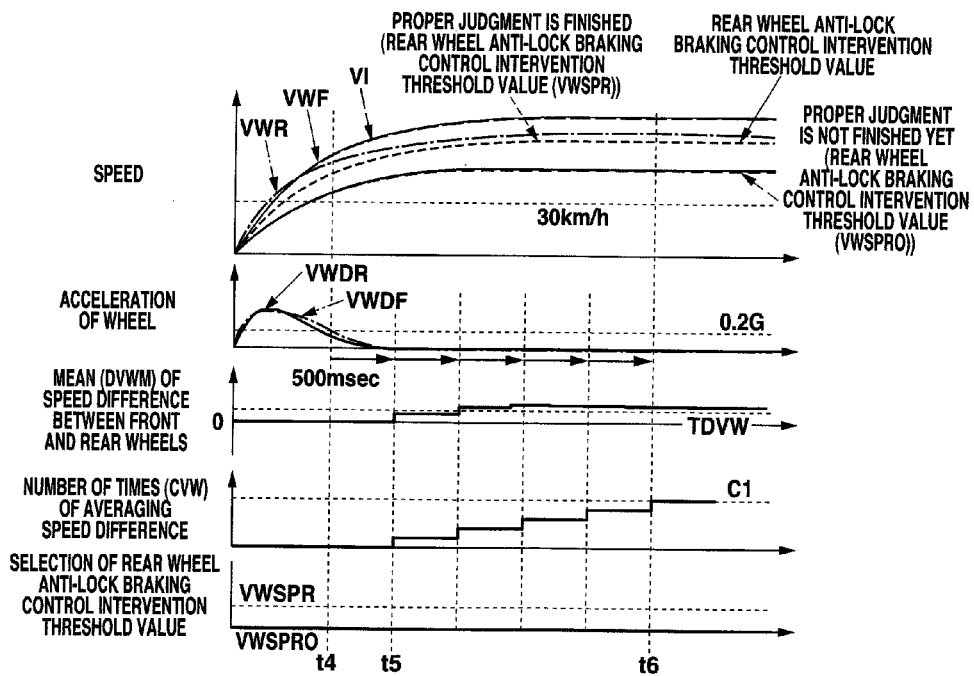

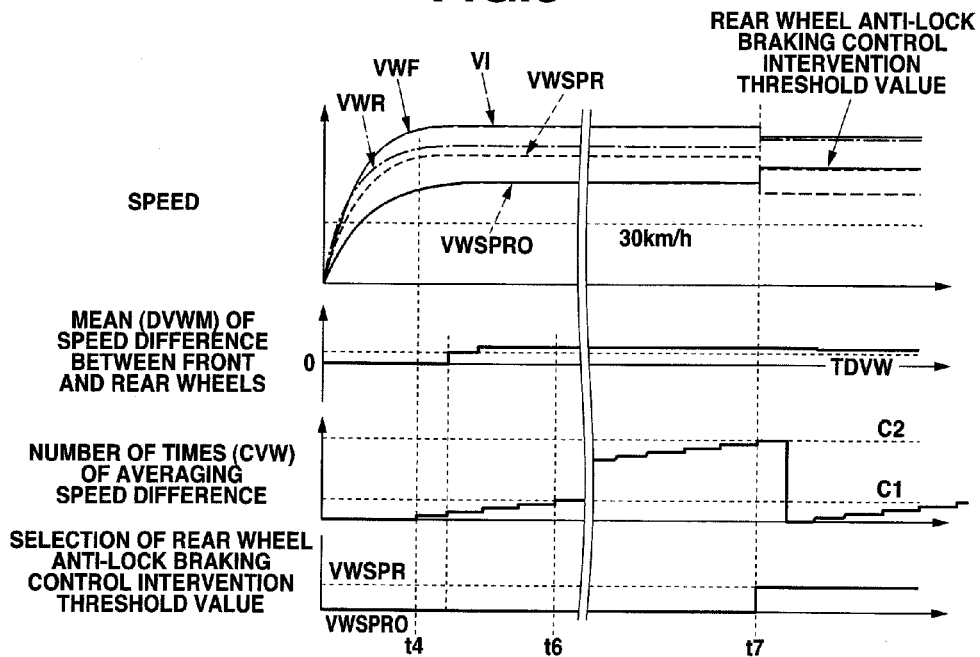
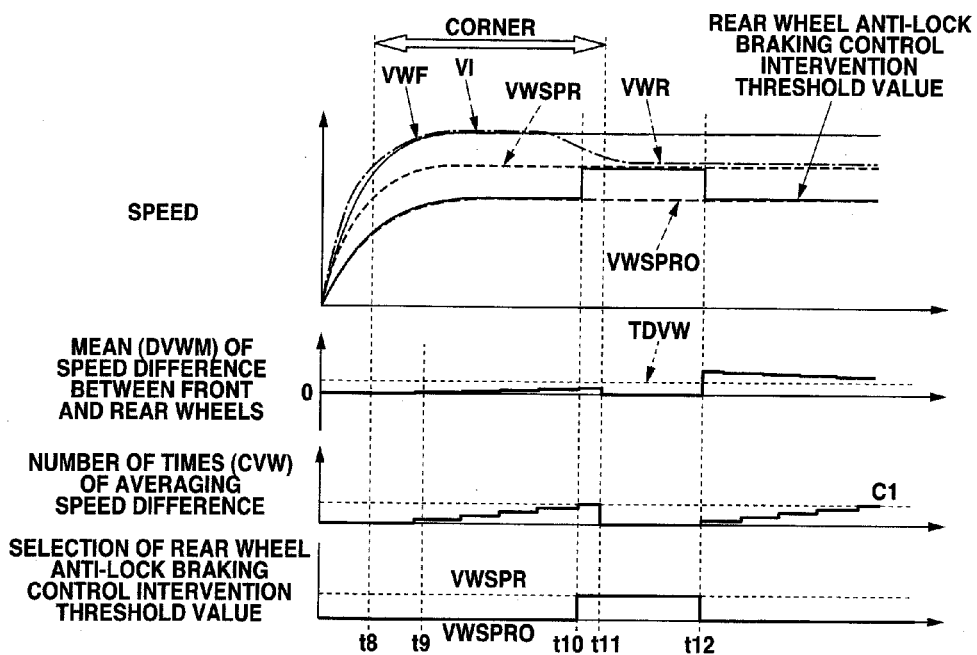

BRAKE CONTROL SYSTEM OF MOTORCYCLE

BACKGROUND OF THE INVENTION

1. Field of the Invention

The present invention relates in general to brakes of motorcycles and more particularly to brake control systems of the motorcycles.

2. Description of the Related Art

Hitherto, in the field of motorcycles, various brake control systems have been proposed and put into practical use. Some of them are of a so-called "anti-lock braking system (viz., ABS)" that prevents wheel lockup while allowing the brakes to continue slowing the wheels.

In the anti-lock braking systems hitherto proposed, respective wheel speed sensors are provided by front and rear wheels of the motorcycle for detecting speeds of the two wheels respectively and a control unit is employed that, based on the speeds detected by the speed sensors, calculates an estimated running speed of the motorcycle, evaluates a deviation (viz., skid degree of each wheel) between the estimated running speed and each of the wheel speeds, and reduces a braking force applied to the wheel when the wheel has shown a predetermined large skid degree.

In Japanese Laid-open Patent Application (Tokkai) 2000-127940 that shows an anti-lock braking system of the above-mentioned type, there is further employed a technique for avoiding a possible malfunction of the anti-lock braking system. In the technique, a difference in speed between the front and rear wheels is detected, and when the speed difference thus detected exceeds a predetermined value, the speed of one wheel is made to gradually approach that of the other wheel.

SUMMARY OF THE INVENTION

As is mentioned hereinabove, in the technique of Japanese Laid-open Patent Application (Tokkai) 2000-127940, the speed of one wheel is made to gradually approach that of the other wheel, and thus, for establishing the same speed of the two wheels, it takes a no small time. Accordingly, when the motorcycle is just after engine-starting, like just after switching on the ignition of the engine, the contrivance for avoiding the malfunction of the anti-lock braking system can not be practically functioned because of impossibility of detecting an effective deference in speed between the front and rear wheels.

Accordingly, it is an object of the present invention to provide a brake control system of a motorcycle, which is free of the above-mentioned drawback.

That is, in accordance with the present invention, there is provided a brake control system of a motorcycle which can suppress or control malfunction of the anti-lock braking system applied to a rear wheel even when the difference between the speeds of the front and rear wheels shows an abnormal value.

In the brake control system of the present invention, for achieving the above-mentioned object, in a period from a time when the ignition of the engine is switched on to a time when a predetermined condition is established, a threshold value for a skid rate is kept to a second predetermined value that is larger than a first predetermined value. The first predetermined value is a value that is commonly set in a normal operation condition of the motorcycle.

In accordance with a first aspect of the present invention, there is provided a brake control system for a motorcycle, which comprises front and rear wheel speed sensors respectively provided by front and rear wheels of the motorcycle; front and rear wheel braking force control devices that control braking liquid pressures respectively applied to the front and rear wheels; and a control unit that includes a vehicle running speed calculating section that calculates an estimated running speed of the motorcycle based on an output from the front wheel speed sensor; a skid rate calculating section that calculates a skid rate of each of the front and rear wheels based on a deviation between the estimated running speed of the motorcycle and each of the outputs from the front and rear wheel speed sensors; an anti-lock braking control section that outputs a pressure reduction instruction to at least one of the front and rear wheel braking force control devices when the calculated skid rate of the corresponding front and/or rear wheel is equal to or larger than a predetermined skid rate threshold value; and a skid rate threshold value changing section that keeps a threshold for the skid rate for the rear wheel to a second skid rate threshold value in a period from a time when the ignition of an engine of the motorcycle is switched on to a time just before a time when a predetermined condition is established and changes the threshold value for the skid rate for the rear wheel to a first skid rate threshold value when the predetermined condition is established, the second skid rate threshold value being larger than the first skid rate threshold value.

In accordance with a second aspect of the present invention, there is provided a brake control system for a motorcycle, which comprises front and rear wheel speed sensors respectively provided by front and rear wheels of the motorcycle; front and rear wheel cylinders that respectively adjust hydraulic pressures applied to the front and rear wheels for braking the same; and a control unit that includes a vehicle running speed calculating section that calculates an estimated running speed of the motorcycle based on an output from the front wheel speed sensor; a skid rate calculating section that calculates a skid rate of each of the front and rear wheels based on a deviation between the estimated running speed of the motorcycle and each of the outputs from the front and rear wheel speed sensors; an anti-lock braking control section that reduces the hydraulic pressure in at least one of the front and rear wheel cylinders when the calculated skid rate of the corresponding front and/or rear wheel is equal to or larger than a predetermined skid rate threshold value; and a different diameter tire judging section that judges whether the front and rear wheels are equipped with different diameter tires or not, the judging section being configured to keep a threshold value for the skid rate for the rear wheel to a second skid rate threshold value in a period from a time when the ignition of an engine of the motorcycle is switched on to a time just before a time when a predetermined condition is established, the second skid rate threshold value being larger than a first skid rate threshold value that is used in a normal operation of the anti-lock braking control section.

In accordance with a third aspect of the present invention, there is provided a brake control system for a motorcycle, which comprises front and rear wheel speed sensors respectively provided by front and rear wheels of the motorcycle, one of the front and rear wheels being of a non-drive type and the other being of a drive type; front and rear wheel braking force control devices that control braking liquid pressures respectively applied to the front and rear wheels; and a control unit that includes a vehicle running speed calculating section that calculates an estimated running speed of the motorcycle based on an output from the speed sensor that detects the speed of the non-drive type wheel; a skid rate calculating section that calculates a skid rate of each of the front and rear wheels based on a deviation between the estimated running speed of the motorcycle and each of the outputs from the front and rear wheel speed sensors; an anti-lock braking control section that outputs a pressure reduction instruction to at least one of the front and rear wheel braking force control devices when the calculated skid rate of the corresponding front and/ or rear wheel is equal to or larger than a predetermined skid rate threshold value; and a skid rate threshold value changing section that keeps a threshold value for the skid rate for the drive type wheel to a second skid rate threshold value until a time when a predetermined condition is established and changes the threshold value for the skid rate for the drive type wheel to a first skid rate threshold value when the predetermined condition is established, the second skid rate threshold value being larger than the first skid rate threshold value.

BRIEF DESCRIPTION OF THE DRAWINGS

Other objects and advantages of the present invention will become apparent from the following description when taken in conjunction with the accompanying drawings, in which:

FIG. 3 is a time chart showing changes of various factors with respect to elapsed time in a threshold value varying control under a condition wherein front and rear wheels are equipped with normal tires;

FIG. 4 is a time chart similar to FIG. 3, but showing a case in which the rear wheel is equipped with a tire larger than a design value tire;

FIG. 5 is a time chart similar to FIG. 4, but showing much longer elapsed time; and FIG. 6 is a time chart similar to FIG. 4, but showing a case in which the motorcycle runs on a corner.

DETAILED DESCRIPTION OF THE INVENTION

In the following, a brake control system of a motorcycle according to the present invention will be described in detail with reference to the accompanying drawings.

Figure 1:
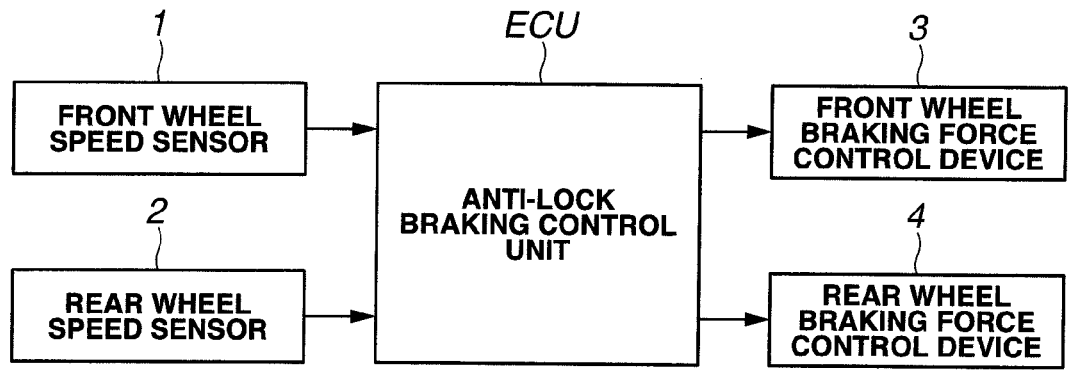
FIG. 1 is a block diagram schematically showing components of a brake control system of a motorcycle according to the present invention.

Referring to FIG. 1, there is shown a block diagram schematically showing components of the brake control system of the invention.

As will be understood from FIG. 1, front and rear wheels of the motorcycle are equipped with front and rear wheel speed sensors 1 and 2 respectively. In the illustrated embodiment, the front wheel is of a non-drive type and the rear wheel is of a drive type that is directly driven by an engine mounted on the motorcycle. Outputs from such front and rear wheel speed sensors 1 and 2 are pulse signals whose numbers correspond to numbers of revolutions of the front and rear wheels respectively. The pulse signals thus outputted from the sensors 1 and 2 are inputted to an anti-lock control unit ECU. In the anti-lock control unit ECU, the pulse signals are converted to the numbers of revolutions of the front and rear wheels respectively. Furthermore, in the anti-lock control unit ECU, with reference to coefficients determined in accordance with radii of the front and rear wheels, front wheel speed VWF and rear wheel speed VWR are calculated from the numbers of revolutions of the front and rear wheels. It is to be noted that the wheel speed VWF or VWR is a distance that is to be moved by the corresponding wheel by a unit time. Furthermore, in the anti-control unit ECU, an estimated vehicle running speed VI is calculated based on the front wheel speed VWF. This calculation is carried out in a vehicle speed calculation section of the unit ECU. Furthermore, in the unit ECU, based on the estimated vehicle running speed VI thus calculated, two skid rates (viz., front wheel skid rate and rear wheel skid rate) for use in the anti-lock braking control are calculated. This calculation is carried out in a skid rate calculation section of the unit ECU. The two skid rates are calculated by using the following equations:

$$\text{Front wheel skid rate} = (VI - VWF)/VI \quad (1)$$

$$\text{Rear wheel skid rate} = (VI - VWR)/VI \quad (2)$$

When the front or rear wheel skid rate shows a value larger than a predetermined value (viz., first skid rate threshold value), judgment is so made that the front or rear wheel has developed a tendency to be locked. In such case, a braking force reduction signal is outputted from the unit ECU to a front wheel braking force control device 3 or a rear wheel braking force control device 4 (which is a so-called braking force control means). These braking force control devices 3 and 4 comprise hydraulic wheel cylinders of brakes that are mounted to the front and rear wheels of the motorcycle. In each of the wheel cylinders, hydraulic pressure is adjusted for producing a suitably controlled braking force applied to the front or rear wheel.

Upon receiving the above-mentioned braking force reduction signal, the front or rear wheel braking force control device 3 or 4 is operated to reduce the braking force applied to the concerned wheel (viz., front or rear wheel that has shown the abnormally larger skid rate). Since each of the wheel braking force control devices 3 and 4 is a known device including a plurality of electromagnetic valves and a pump, detailed explanation of the device 3 or 4 will be omitted.

As will become apparent as the description proceeds, when an ignition switch (not shown) of an engine of the motorcycle is turned ON, the anti-lock control unit ECU carries out initialization of programs installed therein. By this initialization, a threshold value for a rear wheel anti-lock braking control (which will be referred to as "rear wheel anti-lock braking control intervention threshold value" in the following) is set to a value that is larger than a normally used one, as will be described in detail hereinafter.

In case wherein the front and rear wheels of a motorcycle are equipped with different diameter tires or one of the tires has been punctured, the two tires show a difference relative to normally set design values. Accordingly, in such case, a set conversion value used for calculating the wheel speed (which is calculated based on the number of revolutions of the corresponding wheel) tends to have an error, and as a result, there is produced a deviation between the speeds of the front and rear wheels.

While, when the anti-lock braking system is out of action, the estimated vehicle running speed is calculated based on the speed of the front wheel. This is because of the following. That is, due to the nature of the motorcycle, the driven rear wheel tends to show a wheelspin upon acceleration of the motorcycle, and the same rear wheel tends to show a rear lift phenomenon upon deceleration of the motorcycle, and thus, for estimating the vehicle running speed, usage of the speed of the rear wheel is at a disadvantage. Accordingly, for estimating the running speed of the motorcycle, usage of the speed of the rear wheel is not commonly used.

Accordingly, in case of calculating the estimated running speed of a motorcycle based on an acceleration of the front wheel, production of such a deviation that, due to carrying different diameter tires by the motorcycle, the speed of the rear wheel is calculated lower than that of the front wheel means a case wherein the speed of the rear wheel is lower than the estimated running speed of the motorcycle. In this case, it is erroneously detected that the skid of the rear wheel has become large, which tends to induce a malfunction of the anti-lock braking system. Furthermore, when, like in the conventional technique, the speed of one wheel is gradually corrected, it takes a long time for obtaining equal speed of the two wheels. According, in such case, it is impossible to avoid malfunction of the anti-lock braking control system when the motorcycle is just after engine-starting, like just after switching on the ignition of the engine. That is, in such case, the malfunction of the anti-lock braking control system, which would be caused by the mis-detection of skid degree by the speed difference between the front and rear wheels due to carrying the different diameter tires, can't be avoided until the time when the correction is completed.

Accordingly, in the present invention, in a period from a time when the ignition of the engine is switched on to a time when a predetermined condition is established, a threshold value for a skid rate is kept to a second predetermined value that is larger than a first predetermined value. The first predetermined is value is a value that is set in a normal condition of the motorcycle. In other words, the second predetermined value is a value that abstains from taking the anti-lock braking control with respect to the first predetermined value. More specifically, the second predetermined value is a value that induces starting of the anti-lock braking control when the skid rate of the wheel shows a much larger value than usual.

Figure 2:
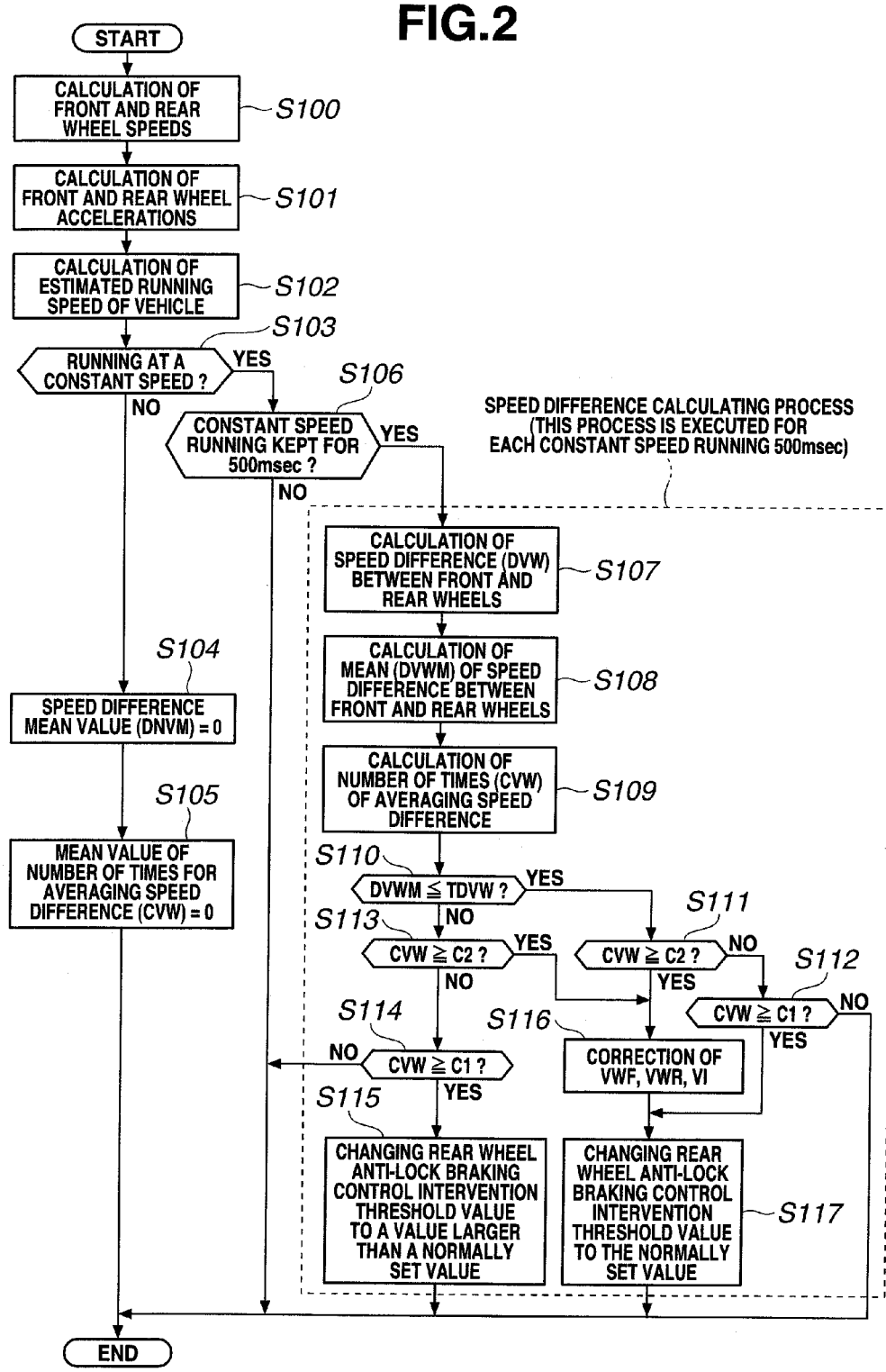
FIG. 2 is a flowchart showing programmed operation steps executed in a control unit used in the present invention for changing a threshold value in accordance with various conditions.

Referring to FIG. 2, there is shown a flowchart showing programmed operation steps executed in a control unit for carrying out a threshold value varying control. Just after ignition ON turning, the operation program is subjected to initialization thereby to set the "rear wheel anti-lock braking control intervention threshold value" to a value that is larger than a normally used value.

At step S100, front and rear wheel speeds VWF and VWR are calculated.

At step S101, front and rear wheel accelerations VWDF and VWDR are derived by differentiating the front and rear wheel speeds VWF and VWR.

At step S102, an estimated running speed VI of the vehicle is calculated based on the front wheel speed VWF.

At step S103, judgment is carried out as to whether the vehicle is running at a constant speed or not. If YES, that is, if it is judged that the vehicle is running at a constant speed, the operation flow goes to step S106. At this step S106, a time for which the vehicle has continuously run at the constant speed is checked. More specifically, if the vehicle running at the constant speed has been kept for 500 msec, the operation flow goes to step S107, step S108 and S109. At step S107, a speed difference DVW between front and rear wheels is calculated, at step S108, the mean value DVWM of the speed difference is calculated and at step S109, the number CVW of times of averaging the speed difference is calculated. A judgment criteria for the vehicle running at a constant speed will be described in detail hereinafter.

At step S110, judgment is carried out as to whether the mean value DVWM of the speed differences is equal to or smaller than a predetermined value TDVW (for example, 3%) or not. If YES, that is, when the mean value DVWM is smaller than the predetermined value TDVW, that is, when the speed difference between the front and rear wheels is small, the operation flow goes to step S111.

At the step S111, judgment is carried out as to whether the value CVW is equal to or larger than a predetermined value C2 (for example, 10 times) or not. If YES, that is, if the value CVW is larger than the predetermined value C2, the operation flow goes to step S116 to correct the front and rear wheel speeds VWF and VWR and the estimated running speed VI of the vehicle. More specifically, at step S116, the speed difference (or different diameter rate) between the front and rear wheels is determined, and based on the speed difference mean value DVWM, the front and rear wheel speeds VWF and VWR and the estimated vehicle running speed VI are corrected.

When the step S116 is finished, errors that have been caused by the speed difference between the front and rear wheels almost disappear, and thus, at step S117, the rear wheel anti-lock braking control intervention threshold value is changed to a normal threshold value.

If NO at step S111, that is, if the value CVW is smaller than the predetermined value C2, the operation flow goes to step S112. At this step S112, judgment is carried out as to whether the value CVW is equal to or larger than a predetermined value C1 (for example, 4 times) or not. If YES, that is, if the value CVW is larger than the predetermined value C1, the operation flow goes to step S117 to change the rear wheel anti-lock braking control intervention threshold value to the normal threshold value. If NO at step S112, that is, if the value CVW is smaller than the predetermined value C1, the operation flow goes to END.

If NO at step S110, that is, if the value DVWM is larger than the predetermined value TDVW (for example, 3%), that is, when the speed difference between the front and rear wheels is large, the operation flow goes to step S113. At this step S113, judgment is carried out as to whether the value CVW is equal to or larger than the predetermined value C2. If YES, that is, if the value CVW is larger than the predetermined value C2, the operation flow goes to step S116. At this step S116, as has been mentioned hereinabove, the speed deviation (or different diameter rate) between the front and rear wheels is determined, and based on the speed difference mean value DVWM, the front and rear wheel speeds VWF and VWR and the estimated vehicle running speed VI are corrected. As is mentioned hereinabove, even if the speed difference between the front and rear wheels is large, errors caused by the speed difference between the front and rear wheels almost disappear when the step S116 is finished, and thus, at step S117, the rear wheel anti-lock braking control intervention threshold value is changed to the normal threshold value.

If NO at step S113, that is, if the value CVW is smaller than the predetermined value C2, the operation flow goes to step S114 seeing a possibility of different diameter tires if the value CVW is larger than the other predetermined value C1. That is, as step S114, judgment is carried out as to whether or not the value CVW is equal to or larger than the predetermined value C1. If YES at this step S114, that is, if the value CVW is larger than the predetermined value C1, the operation flow goes to step S115 to change the rear wheel anti-lock braking control intervention threshold value to a larger value that is larger than the normal threshold value. If NO at step S114, that is, if the value CVW is smaller than the predetermined value C1, the operation flow goes to END.

If NO at step S103, that is, if it is judged that the vehicle is not running at the constant speed, the operation flow goes to step S104 and step S105 and goes to END. At step S104, the speed difference mean value DVWM is set to 0 (zero), and at step S105, the number CVW of times for averaging the speed difference is set to 0 (zero).

In the following, explanation will be directed to a time chart of FIG. 3 that shows changes of various factors with respect to elapsed time in a threshold value varying control under a condition wherein front and rear wheels are equipped with normal tires. As an initial condition, a condition just after switching on the ignition of the engine is assumed.

As is seen from the time chart, at first, with reference to the front wheel speed VWF, the estimated vehicle running speed VI is provided. Furthermore, by applying a skid rate to the estimated vehicle running speed VI, the rear wheel anti-lock braking control intervention threshold values VWSPR and VWSPRO are provided.

It is to be noted that the value VWSPR is a value (viz., first skid rate threshold value) that is set in a normal control and the value VWSPRO is a value (viz., a second skid rate threshold value) that is set for avoiding a malfunction of the rear wheel anti-lock braking control according to the present invention. It is further to be noted that the value VWSPRO (viz., second skid rate threshold value) is set in a skid rate range that is higher than that of the value VWSPR (viz., first skid rate threshold value).

As is mentioned hereinabove, just after starting of the motorcycle, that is, just after switching on the ignition of the engine, it is unclear whether the diameter difference between the front and rear wheels induces a malfunction of the anti-lock braking control or not. Accordingly, in such time, the rear wheel anti-lock braking control intervention threshold value is set to the value VWSPRO (viz., second skid rate threshold value). Although not shown in the time chart, there is no need of changing the front wheel anti-lock braking control intervention threshold value. This is because the estimated vehicle running speed VI is provided based on the front wheel speed VWF, and under a normal cruising, no skid occurs and thus the possibility of malfunction is quite low.

In the time chart of FIG. 3, at time t1, the front wheel acceleration VWDF and the rear wheel acceleration VWDR each become within a predetermined value (for example, ±0.2 G in case of the flowchart of FIG. 2), and at time t2 when the estimated vehicle running speed VI higher than 30 Km/h has continued for a given time (for example, 500 msec in case of the flowchart of FIG. 2), judgment for a constant speed is effected (by a constant speed condition judgment section) and the speed difference DVW between the front and rear wheels at that time t2 is derived from the following equation (3):

$$DVW = (VWF - VWR)/VWF \quad (3)$$

In this case, the rotation of the front and rear wheels is inevitably attended with fine fluctuations. Thus, for calculating the value DVW, it is preferable to employ a filtering process, such as a moving average applied to several samples just before the calculation.

On each time of calculating the speed difference DVW, the mean value DVWM of the calculated speed difference is derived from the number CVW of times by using the following equation (4):

$$DVWM = (DVWM \times CVW + DVW)/(CVW + 1) \quad (4)$$

At time t3 of the time chart of FIG. 3, the number CVW of times (viz., averaged calculation times) shows a predetermined value C1 (4 times in the illustrated embodiment). When, at this time t3, the mean value DVWM is equal to or smaller than a predetermined value TDVW (for example, 3%), the rear wheel anti-lock braking control intervention threshold value is set to the normal value VWSPR judging that the different diameter condition between the front and rear wheels would not induce malfunction of the rear wheel. As will be understood from the above, just after starting of the motorcycle, that is, just after switching on the ignition of the engine, the rear wheel anti-lock braking control intervention threshold value is set to the lower value and thereafter once a predetermined condition is established, the rear wheel anti-lock braking control intervention threshold value is instantly set to the normal value VWSPR. With this operation, the malfunction of the anti-lock braking control applied to the rear wheel can be avoided.

In the following, explanation will be directed to a time chart of FIG. 4 that shows changes of various factors with respect to elapsed time in a threshold value varying control under a condition wherein the rear wheel is equipped with a tire that is larger than a design value tire.

In the time chart of FIG. 4, at time t4, the condition for the constant speed is established, and at time t5, the speed difference DVW between the front and rear wheels is calculated. Since the rear wheel speed VWR is reduced, the calculated value for the speed difference DVW shows a value that is larger than 0 (zero). At time t6, the value CVW (viz., mean value of calculation times) becomes the predetermined value C1. However, in this case, the mean value DVWM of the speed differences exceeds the predetermined value TDVW, and thus, the rear wheel anti-lock braking control intervention threshold value is kept to the value VWSPRO (viz., second skid rate threshold value), judging that malfunction (viz., erroneous intervention) of the rear wheel would be induced. As is seen from the time chart of FIG. 4, the difference between the value VWR (or rear wheel speed) and the value VWSPR (or first skid rate threshold value) is quite small, and thus only a small braking action and a noise of a drive side (such as engine brake or the like) tend to induce of a skid that is smaller than the anti-lock braking control intervention threshold value, which increases the possibility of raising the malfunction of the anti-lock braking control.

As is known, the rear wheel anti-lock braking control of a motorcycle tends to induce a so-called load reduction phenomenon (viz., the phenomenon wherein the rear wheel is applied with a lifting force), and thus, such rear wheel control is easily affected by a noise of a drive side. Under this condition, judgment for a road surface friction coefficient is difficult, and thus, in case of applying the anti-lock braking control to only the rear wheel, the road surface friction coefficient may be derived based on a deceleration of the vehicle. However, in this case wherein the operation is based on the malfunction, when the deceleration is very small, judgment is so made that the road surface friction coefficient is low and thus in such a case the possibility of advancing the control intervention is increased. In order to avoid such case, in the present invention, the rear wheel anti-lock braking control intervention threshold value is suitably changed in accordance with the result of the judgment of the speed difference between the front and rear wheels, which increases reliability of the anti-lock braking control system.

In the following, explanation will be directed to a time chart of FIG. 5 that is similar to the above-mentioned time chart of FIG. 4 except that in FIG. 5, a much longer elapsed time is shown.

In the time chart of FIG. 5, at time t6, the mean value DVWM (viz., the averaged value of speed differences between the front and rear wheels at the predetermined time C1) exceeds the predetermined value TDVW (for example, 3%), and thus, the rear wheel anti-lock braking control intervention threshold value is kept to the value VWSPRO. Thereafter, at time t7 when the value CVW (viz., the number of times of averaging the speed differences) has exceeded the predetermined value C2 (for example, 10 times), the mean value DVWM still exceeds the predetermined value TDVW. In this case, judgment is so made that the tires held by the front and rear wheels have different diameters, and based on the mean value DVWM, the front and rear wheel speeds VWF and VWR are corrected in a manner to show the same speed, and the estimated vehicle running speed VI is derived based on the front wheel speed VWF.

Since the front and rear wheel speeds VWF and VWR and the estimated vehicle running speed VI are calculated in a manner to establish a matched vehicle speed, judgment for the rear wheel anti-lock braking control intervention is properly carried out. Accordingly, once the correction is properly finished, the rear wheel anti-lock braking control intervention threshold value is set to the normal threshold value VWSPR. By employing this operation, malfunction of the anti-lock braking control applied to the rear wheel can be assuredly avoided irrespective of whether the speed difference is present or absent between the front and rear wheels.

In the following, explanation will be directed to a time chart of FIG. 6 that is similar to the above-mentioned time chart of FIG. 5 except that in FIG. 6, the motorcycle runs on a corner.

As is known, when running on a corner, the motorcycle is suitably inclined for safety and smoothed running. In such running on the curve, the locus drawn by a contact point of the tire has an error relative to a locus that would be drawn by the contact point of the tire when the motorcycle runs with upright posture. (Usually, the locus error is somewhat high in case of the rear wheel). Accordingly, when the motorcycle makes a turning just after starting thereof, calculation of the speed difference and diameter difference between the front and rear wheels tends to have errors.

For example, when, with the rear wheel equipped with a tire larger than a design value tire, the motorcycle goes into a corner just after the constant speed judgment established just after switching on the ignition of the engine, it may occur that the rear wheel anti-lock braking control intervention threshold value is set to the normal value VWSPR because, owing to the errors, the speed difference between the front and rear wheels has been estimated at a small value in spite of a remarkable speed difference between the two wheels. In such case, when the motorcycle gets out of the corner and goes into a straight course, a proper calculation is carried out for deriving the speed difference between the front and rear wheels, and thus, the rear wheel anti-lock braking control intervention threshold value can be returned to the value that is larger than the normal value.

In the time chart of FIG. 6, from time t8 when the motorcycle just starts to time t11, the motorcycle runs on the corner. During this corner running, the rear wheel speed is higher than that of straight-ahead driving by 3% to 5%, and thus when the constant speed driving is detected at time t9, there is calculated a value that is different from the actual speed difference between the two wheels. When, with the different value being kept, the mean value DVWM becomes lower than the predetermined value TDVW (for example, 3%) at time t10, the rear wheel anti-lock braking control intervention threshold value is set to the value VWSPR judging that there is no possibility of malfunction of the anti-lock braking control applied to the rear wheel.

While, when the motorcycle changes the running course from the corner to the straight course at time t11, the rear wheel speed VWR is reduced. At the time t11, due to a certain acceleration induced by the reduction of the speed of the rear wheel, the process for judging the constant speed running is finished for a while, and at time t12 when calculation of the mean value DVWM begins, a proper speed difference between the front and rear wheels is detected. In this case, the rear wheel anti-lock braking control intervention threshold value is returned to the larger value again judging that the judgment at time t10 is not reliable. Thereafter, similar action to that of the time chart of FIG. 5 is carried out.

The present invention will be much clearly understood from the following description.

(1) In a brake control system of a motorcycle according to the present invention, there are provided a front wheel speed sensor 1 and a rear wheel speed sensor 2 which are respectively provided by front and rear wheels of the motor cycle, a front wheel braking force control device 3 and a rear wheel braking force control device 4 which control braking liquid pressures respectively applied to the front and rear wheels, and an anti-lock braking control unit ECU which comprises a vehicle running speed calculating section that calculates an estimated running speed VI of the motorcycle based on an output from the front wheel speed sensor 1, a skid rate calculating section that calculates a skid rate of each of the front and rear wheels based on a deviation between the estimated running speed VI of the motorcycle and each of the outputs from the front and rear wheel speed sensors 1 and 2, an anti-lock braking control section that outputs a pressure reduction instruction to either one or both of the front and rear wheel braking force control devices 3 and 4 when the calculated skid rate of the corresponding front and/or rear wheel is equal to or larger than a predetermined skid rate threshold value, and a skid rate threshold value changing section that keeps the skid rate threshold value for the rear wheel to a second skid rate threshold value VWSPRO in a period from a time when the ignition of an engine of the motorcycle is switched on to a time just before a time when a predetermined condition is established and changes the skid rate threshold value for the rear wheel to a first skid rate threshold value VWSPR when the predetermined condition is established, the second skid rate threshold value being larger than the first skid rate threshold value.

Accordingly, even in case wherein the motorcycle is just after engine starting, like just after switching on the ignition of the engine, erroneous detection of skid degree of the wheel that would be caused by the speed difference between the front and rear wheels can be avoided.

(2) The anti-lock braking control unit ECU may further comprise a constant speed running judging section that judges whether the motorcycle is under a constant speed running or not, and a speed difference detecting section that detects a speed difference between the front and rear wheels when the constant speed running judging section judges that the motorcycle is under the constant speed running. The predetermined condition for changing the skid rate threshold value for the rear wheel from the second skid rate threshold value VWSPRO to the first skid rate threshold value VWSPR is a condition wherein the mean value DVWM of the speed difference between the front and rear wheels is smaller than a predetermined value TDVW, or if the mean value DVWM of the speed difference between the front and rear wheels is equal to or larger than the predetermined value TDVW, a condition that is established after the outputs from the wheel speed sensors are corrected in a manner to reduce the speed difference between the front and rear wheels to zero.

Accordingly, when the front and rear wheels are equipped with tires other than different diameter tires, the skid rate threshold value for the rear wheel is changed to the first skid rate threshold value VWSPR, and when it is judged that the front and rear wheels are equipped with the different diameter tires, such change is carried out after the speeds detected by the wheel speed sensors 1 and 2 are corrected, and thus, erroneous intervention of the anti-lock braking control can be avoided. Furthermore, as is mentioned hereinabove, when the mean value CVW (viz., mean value of the number of times for averaging the speed difference between the front and rear wheels) is satisfied, such correction is instantly carried out, which is superior to the above-mentioned prior art technique wherein the output from the wheel speed sensor is gradually corrected.

(3) In the anti-lock braking control unit ECU, when, after completion of change from the second skid rate threshold value VWSPRO to the first skid rate threshold value VWSPR, the mean value DVWM of the speed difference becomes larger than the predetermined value TDVW (for example, 3%), the skid rate threshold value for the rear wheel is returned to the second skid rate threshold value VWSPRO.

Accordingly, even if, with the motorcycle running into a corner just after starting thereof, judgment is so made that proper tires are used in spite of actual use of different diameter tires, the erroneous information on the tires can be corrected thereafter, and thus, erroneous intervention of the anti-lock braking control can be avoided.

As is described hereinabove, even if a certain speed difference is produced between the front and rear wheels due to the different diameters of tires, malfunction of the anti-lock braking control to the rear wheel is assuredly avoided by processing the rear wheel anti-lock braking control intervention threshold value in the above-mentioned manner.

In the above-mentioned embodiment, by using the mean value of the speed difference between the front and rear wheels and the number of times for averaging the speed difference, judgments are made. However, if desired, such judgments may be made by using filtered value of the speed difference between the front and rear wheels as well as a timelike concept.

Furthermore, in the above-mentioned embodiment, a skid caused by braking is used for avoiding malfunction of the anti-lock braking system. However, if desired, a skid caused by rapid acceleration may be used for the same purpose, that is, for avoiding malfunction of a traction control. That is, for example, if the rear wheel speed is calculated to a high level due to different diameter tires equipped to front and rear wheels of the motorcycle, the skid threshold value for the control intervention is set to a value larger than a normal value. With this technique, malfunction of the traction control can be avoided. Since in this technique the skid rate has a reversed value, the speed difference DVW between the front and rear wheels is calculated by using the following equation (5)

$$DVW=(VWR-VWF)/VWF \qquad (5).$$

The entire contents of Japanese Patent Application 2009-245162 filed Oct. 26, 2009 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A brake control system for a motorcycle, comprising:
 front and rear wheel speed sensors respectively provided by front and rear wheels of the motorcycle;
 front and rear wheel braking force control devices that control braking liquid pressures respectively applied to the front and rear wheels; and
 a control unit that includes:
  a vehicle running speed calculating section that calculates an estimated running speed of the motorcycle based on an output from the front wheel speed sensor;
  a skid rate calculating section that calculates a skid rate of each of the front and rear wheels based on a deviation between the estimated running speed of the motorcycle and each of the outputs from the front and rear wheel speed sensors;
  an anti-lock braking control section that outputs a pressure reduction instruction to at least one of the front and rear wheel braking force control devices when the calculated skid rate of the corresponding front and/or rear wheel is equal to or larger than a predetermined skid rate threshold value; and
  a skid rate threshold value changing section that keeps a threshold value for the skid rate for the rear wheel to a second skid rate threshold value in a period from a time when the ignition of an engine of the motorcycle is switched on to a time just before a time when a predetermined condition is established and changes the threshold value for the skid rate for the rear wheel to a first skid rate threshold value when the predetermined condition is established, the second skid rate threshold value being larger than the first skid rate threshold value.

2. A brake control system for a motorcycle as claimed in claim 1, in which the control unit further includes a constant speed running judging section that judges whether the motorcycle is under a constant speed running or not, the predetermined condition being a condition established after judgment by the constant speed running judging section.

3. A brake control system for a motorcycle as claimed in claim 2, in which the constant speed running judging section judges that the motorcycle is under the constant speed running when the estimated running speed of the motorcycle is equal to or greater than a predetermined value and the condition of the constant speed running is kept for a predetermined time.

4. A brake control system for a motorcycle as claimed in claim 3, in which the control unit further includes a speed difference detecting section that detects a speed difference between the front and rear wheels when the motorcycle is under the constant speed running, the predetermined condition being a condition established after the speed difference is corrected to be smaller than a predetermined value if the speed difference has shown a value larger than the predetermined value.

5. A brake control system for a motorcycle as claimed in claim 4, in which the control unit is configured in that when the detected speed difference is equal to or larger than a predetermined value, the skid rate threshold value for the rear wheel is kept to the second skid rate threshold value.

6. A brake control system for a motorcycle as claimed in claim 3, in which the control unit further includes a speed difference detecting section that detects a speed difference between the front and rear wheels when the motorcycle is under the constant speed running, the predetermined condition being a condition established after the outputs of the front and rear wheel speed sensors are corrected in a manner to induce the same speed of the front and rear wheels if the speed difference has shown a value larger than a predetermined value.

7. A brake control system for a motorcycle as claimed in claim 6, in which the control unit is configured in that when the speed difference becomes equal to or larger than the predetermined value after changing of the skid rate threshold value for the rear wheel to the first skid rate threshold value, the skid rate threshold value for the rear wheel is returned to the second skid rate threshold value.

8. A brake control system for a motorcycle as claimed in claim 1, in which the control unit further includes:
- a constant speed running judging section that judges whether the motorcycle is under a constant speed running or not; and
- a speed difference detecting section that detects a speed difference between the front and rear wheels when the motorcycle is under a constant speed running,
- the control unit being configured in that when the detected speed difference is larger than a predetermined value, the speed difference is corrected to a value smaller than the predetermined value judging that the front and rear wheels are equipped with different diameter tires and in that the anti-lock braking control section is operated based on the corrected speed difference.

9. A brake control system for a motorcycle as claimed in claim 8, in which the control unit is configured in that when the detected speed difference is larger than the predetermined value, the outputs from the front and rear wheel speed sensors are corrected in a manner to induce the same speed of the front and rear wheels, and in that the anti-lock braking control section is operated based on the corrected speed difference.

10. A brake control system for a motorcycle, comprising:
- front and rear wheel speed sensors respectively provided by front and rear wheels of the motorcycle;
- front and rear wheel cylinders that respectively adjust hydraulic pressures applied to the front and rear wheels for braking the same; and
- a control unit that includes:
    - a vehicle running speed calculating section that calculates an estimated running speed of the motorcycle based on an output from the front wheel speed sensor;
    - a skid rate calculating section that calculates a skid rate of each of the front and rear wheels based on a deviation between the estimated running speed of the motorcycle and each of the outputs from the front and rear wheel speed sensors;
    - an anti-lock braking control section that reduces the hydraulic pressure in at least one of the front and rear wheel cylinders when the calculated skid rate of the corresponding front and/or rear wheel is equal to or larger than a predetermined skid rate threshold value; and
    - a different diameter tire judging section that judges whether the front and rear wheels are equipped with different diameter tires or not, the judging section being configured to keep a threshold value for the skid rate for the rear wheel to a second skid rate threshold value in a period from a time when the ignition of an engine of the motorcycle is switched on to a time just before a time when a predetermined condition is established, the second skid rate threshold value being larger than a first skid rate threshold value that is used in a normal operation of the anti-lock braking control section.

11. A brake control system for a motorcycle as claimed in claim 10, in which the control unit further includes a skid rate threshold value changing section that changes the skid rate threshold value for the rear wheel to the first skid rate threshold value when the predetermined condition is established.

12. A brake control system for a motorcycle as claimed in claim 11, in which the control unit further includes a constant speed running judging section that judges whether the motorcycle is under a constant speed running or not, the predetermined condition being a condition established after judgment by the constant speed running judging section.

13. A brake control system for a motorcycle as claimed in claim 12, in which the constant speed running judging section judges that the motorcycle is under the constant speed running when the estimated running speed of the motorcycle is equal to or greater than a predetermined value and the condition of the constant speed running is kept for a predetermined time.

14. A brake control system for a motorcycle as claimed in claim 13, in which the control unit further includes a speed difference detecting section that detects a speed difference between the front and rear wheels when the motorcycle is under the constant speed running, the predetermined condition being a condition established after the speed difference is corrected to be smaller than a predetermined value if the speed difference has shown a value larger than the predetermined value.

15. A brake control system for a motorcycle as claimed in claim 13, in which the control unit further includes a speed difference detecting section that detects a speed difference between the front and rear wheels when the motorcycle is under the constant speed running, the predetermined condition being a condition established after the outputs of the front and rear wheel speed sensors are connected in a manner to induce the same speed of the front and rear wheels if the speed difference has shown a value larger than a predetermined value.

16. A brake control system for a motorcycle as claimed in claim 13, in which the control unit is configured in that when the speed difference becomes equal to or larger than the predetermined value after changing of the skid rate threshold value for the rear wheel to the first skid rate threshold value, the skid rate threshold value for the rear wheel is returned to the second skid rate threshold value.

17. A brake control system for a motorcycle as claimed in claim 13, in which the control unit is configured in that when the detected speed difference between the front and rear wheels is equal to or larger than a predetermined value, the skid rate threshold value for the rear wheel is kept to the second skid rate threshold value.

18. A brake control system for a motorcycle, comprising:
- front and rear wheel speed sensors respectively provided by front and rear wheels of the motorcycle, one of the front and rear wheels being of a non-drive and the other being of a drive;
- front and rear wheel braking force control devices that control braking liquid pressures respectively applied to the front and rear wheels; and
- a control unit that includes:
    - a vehicle running speed calculating section that calculates an estimated running speed of the motorcycle based on an output from the speed sensor that detects the speed of the non-drive wheel;
    - a skid rate calculating section that calculates a skid rate of each of the front and rear wheels based on a deviation between the estimated running speed of the motorcycle and each of the outputs from the front and rear wheel speed sensors;
    - an anti-lock braking control section that outputs a pressure reduction instruction to at least one of the front and rear wheel braking force control devices when the calculated skid rate of the corresponding front and/or rear wheel is equal to or larger than a predetermined skid rate threshold value; and
    - a skid rate threshold value changing section that keeps a threshold value for the skid rate for the drive wheel to a second skid rate threshold value until a time when a predetermined condition is established and changes the threshold value for the skid rate for the drive wheel to a first skid rate threshold value when the predetermined condition is established, the second skid rate threshold value being larger than the first skid rate threshold value.

19. A brake control system for a motorcycle as claimed in claim 18, in which the control unit is configured to keep the skid rate threshold value for the drive wheel to the second skid rate threshold value in a period from a time when the ignition of an engine of the motorcycle is switched on to a time just before a time when the predetermined condition is established, and judge that the motorcycle is under a constant speed running when the calculated estimated running speed of the motorcycle is equal to or larger than a predetermined value and the condition of the constant speed running is kept for a predetermined time, and in which the control unit further includes a speed difference detecting section that detects a speed difference between the front and rear wheels when the motorcycle is under the constant speed running, the predetermined condition being a condition established after the speed difference is corrected to be smaller than a predetermined value if the speed difference has shown a value larger than the predetermined value or a condition established after the outputs of the front and rear wheel speed sensors are corrected in a manner to induce the same speed of the front and rear wheels if the speed difference has shown a value larger than the predetermined value.

20. A brake control system for a motorcycle as claimed in claim 19, in which the control unit is configured in that when the speed difference becomes larger than a predetermined value after the skid rate threshold value for the drive wheel is changed to the first skid rate threshold value, the skid rate threshold value for the drive wheel is returned to the second skid rate threshold value.

* * * * *